UNITED STATES PATENT OFFICE.

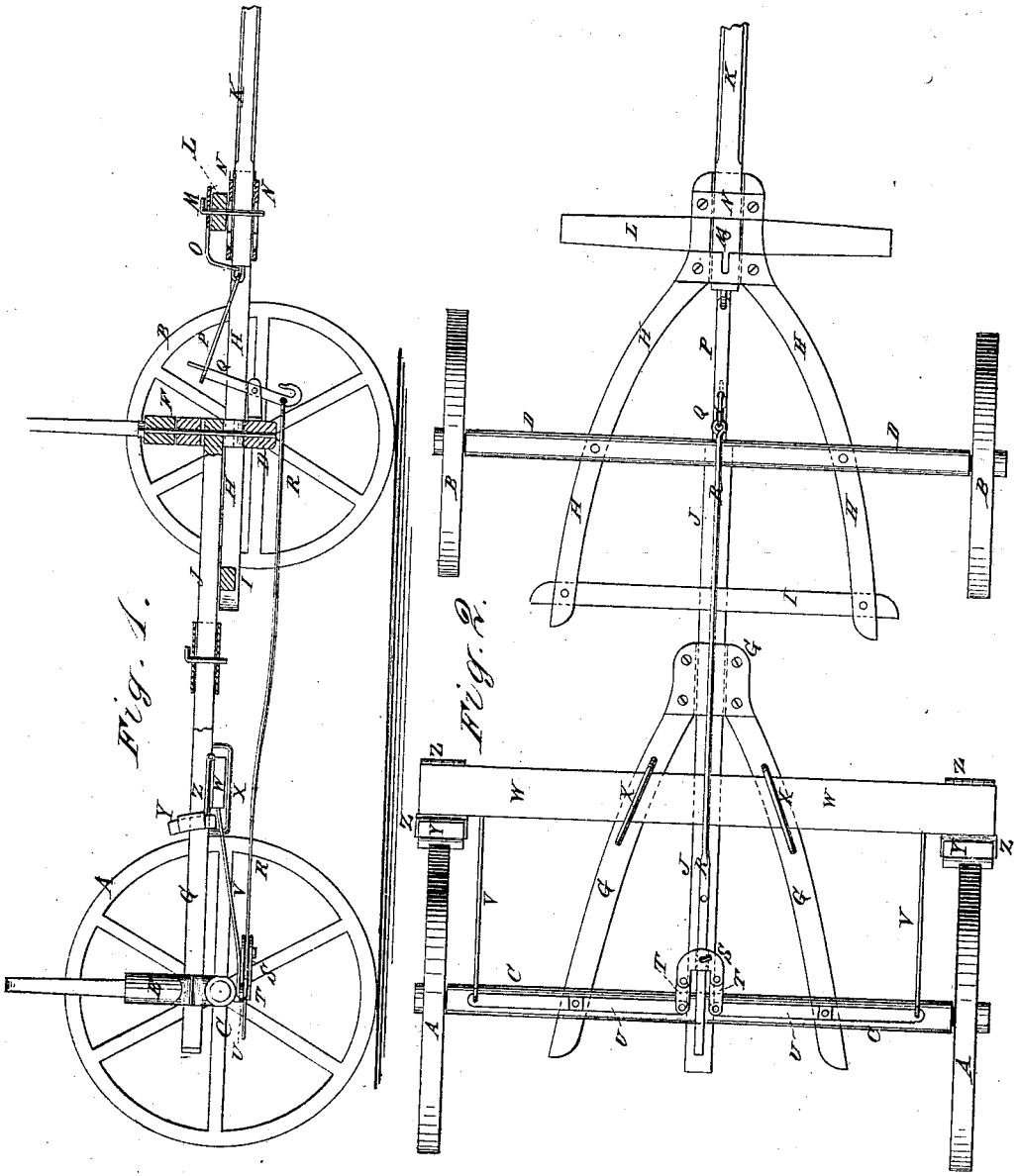

WILLIAM L. WHITMAN AND EPHRAIM MANES, OF RINGGOLD, GEORGIA.

IMPROVEMENT IN AUTOMATIC WAGON-BRAKES.

Specification forming part of Letters Patent No. 196,406, dated October 23, 1877; application filed August 11, 1877.

*To all whom it may concern:*

Be it known that we, WILLIAM L. WHITMAN and EPHRAIM MANES, of Ringgold, in the county of Catoosa and State of Georgia, have invented a new and useful Improvement in Automatic Wagon-Brake, of which the following is a specification:

Figure 1 is a side view of a wagon-gearing to which our improved brake has been applied. Fig. 2 is a bottom view of the same.

Similar letters of reference indicate corresponding parts.

The object of this invention is to furnish an improved brake for attachment to wagons which shall be so constructed that the forward pressure of the wagon against the horses will apply the brake; which will enable the wagon to be backed without applying the brake; which may be so arranged that draft upon the wagon will apply the brake to adapt it to be used as a clog to prevent the horses from starting; and which shall be simple in construction, inexpensive in manufacture, reliable in use, and not liable to get out of order.

The invention consists in the combination of the strap, the lever, the long rod, the two levers, and the two rods with the tongue, the two axles, and the brake-bar.

A A are the rear wheels; B B are the forward wheels; C is the rear axle; D is the forward axle; E is the rear bolster; F is the forward bolster; G G are the rear hounds; H H are the forward hounds; I is the sway-bar; J is the reach, and K is the tongue, about the construction of all of which parts there is nothing new.

L is the double-tree, which is pivoted in place by the hammer or pin M. The hammer M passes through a hole in the double-tree L, through a hole in the tongue K, through a slot in the plates N, attached to the upper and lower sides of the forward ends of the hounds H, and through a hole in the hammer-strap O. The other end of the hammer-strap O is pivoted to the rear end of the tongue K.

To the rear end of the tongue K is also pivoted the end of a strap, P, which is made a little longer than the hammer-strap O, and has a hole in its other end to adapt it to be hooked upon the upper end of the lever Q, or upon a hook formed upon the lower end of said lever Q. The lever Q is pivoted toward its lower end to lugs attached to the forward side of the center of the forward axle D.

To the lower end of the lever Q is pivoted the forward end of the rod R, which passes back beneath the reach J, and to its rear part, a little in front of the rear axle C, is adjustably pivoted a cross-head, S, with the ends of which are connected, by short links T, the inner ends of two levers, U, which are placed beneath, and are pivoted to the rear axle C.

To the outer ends of the levers U are pivoted the rear ends of the rods V, the forward ends of which are attached to the end parts of the brake-bar W.

The rods V are designed to be secured to the brake-bar W by nuts, two to each rod, which are screwed upon them, one upon each side of the said brake-bar, so that it can be adjusted nearer to or farther from the wheels A, as required. The brake-bar W passes through and slides in keepers X, attached to the under side of the hounds G.

Y are the brake-shoes, which are placed in iron holders Z, which cross the upper side of the ends of the brake-bar W, and are hinged to said brake-bar at its forward edge, so that when pressed back against the wheels A the said wheels, if turning forward, will press the said brake-shoes and holders down upon the brake-bar W, and cause the said brake-shoes to hug the wheels snugly; but if the wheels A are turning backward the friction of the wheels A will raise the brake-shoes and holders upon their hinges, so that they will not impede the backing of the wagon.

With this construction, when the wagon presses forward against the horses in going down hill, the levers and rods Q R U V will push the brake-bar W back, and apply the brake with a force proportioned to the forward pressure of the wagon. When the horses are to be left standing, and there is no convenience for hitching them, the strap P is unhooked from the upper end of the lever Q, and hooked upon its lower end, so that the least draft-strain will apply the brake, and the horses will thus be prevented from moving.

Having thus described our invention, we claim as new and desire to secure by Letters Patent—

The combination of the strap P, the lever Q, the rod R, with its cross-head and links, the levers U, and the rods V with the tongue K, the axles D C, and the brake-bar W, substantially as herein shown and described.

WILLIAM LANE WHITMAN.
EPHRAIM MANES.

Witnesses:
WM. S. INMAN,
W. H. HILL.